United States Patent [19]

Drewel et al.

[11] Patent Number: 4,800,059

[45] Date of Patent: Jan. 24, 1989

[54] PROCESS AND APPARATUS FOR LOADING A TIRE PRESS

[75] Inventors: Günter Drewel, Seevetal; Horst Enoch; Klaus Grotkasten, both of Hamburg, all of Fed. Rep. of Germany

[73] Assignee: Fried. Krupp Gesellschaft mit beschrankter Haftung, Essen, Fed. Rep. of Germany

[21] Appl. No.: 9,386

[22] Filed: Jan. 30, 1987

[30] Foreign Application Priority Data

Feb. 1, 1986 [DE]  Fed. Rep. of Germany ....... 3603076

[51] Int. Cl.⁴ ..................... B29C 33/30; B29C 35/00; B65G 47/90
[52] U.S. Cl. .................................. 264/502; 264/315; 264/326; 425/36; 425/38; 425/58; 414/428; 414/680
[58] Field of Search .................. 264/315, 326; 425/33, 425/36, 38, 52, 58; 414/428, 680

[56] References Cited

U.S. PATENT DOCUMENTS

| 3,794,457 | 2/1974 | Gazuit ................................. 425/38 |
| 4,447,385 | 5/1984 | Blosser et al. ......................... 425/38 |
| 4,472,125 | 9/1984 | Kubo et al. ............................ 425/38 |

*Primary Examiner*—Jan H. Silbaugh
*Assistant Examiner*—Neil Michael McCarthy
*Attorney, Agent, or Firm*—Herbert Dubno

[57] ABSTRACT

A loading process for a heated tire press is described herein in which a loader takes an unfinished tire from an unfinished tire stand and puts it between the tire forming pieces of the tire press. This loader travels with folded-in clamp jaws into the inside of the unfinished tire from below, engages it with extended clamp jaws inside of the upper bead from below, transports it in this position to the upper tire forming piece and raises it until its upper bead presses against the upper rim ring on the upper tire forming piece. The upper bead is held there by an auxiliary bellows, retaining fastener or the like. Subsequently the clamp jaws are folded in again and the loader retracted.

6 Claims, 4 Drawing Sheets

PROCESS AND APPARATUS FOR LOADING A TIRE PRESS

FIELD OF THE INVENTION

Our invention relates to a process and apparatus for loading a tire press and, more particularly, to a process and apparatus for putting a tire blank or unfinished tire carcass to be vulcanized in a heated tire press.

BACKGROUND OF THE INVENTION

A process for putting a tire blank or unfinished tire to be vulcanized in a heated tire press from a tire-blank stand comprises engaging or gripping the tire blank by a loader, swinging the tire blank into position between the tire-forming pieces of the heated tire press and fastening the heated tire press to the upper bead of the tire blank. This process further comprises releasing and pivoting away the loader from the unfinished tire, closing the tire press so that the upper and the lower bead contact on the associated rim rings of the tire press, fixing them thereon by air pressure and finally further closing the tire forming pieces on the unfinished tire to effect vulcanization.

Manual operation of the heated tire press is known both with centrally controlled tire forming pieces and also in many component segment forming pieces. The socalled outer gripper is used for transport of the unfinished tire. It fastens on the outer circumference of the unfinished tire and brings it into position between the tire-forming pieces of the opened heated tire press. Then as taught in U.S. Pat. No. 4,447,385 the upper rim ring travels from the upper tire forming pieces down until it reaches the upper bead of the tire blank. Subsequently the upper bead is fixed on the upper rim ring by an auxiliary bellows and then the outer gripper is released and removed. Thus a special retaining and moving mechanism is required for that rim ring. Moreover a suitable traveling device is required for mechanically fixing the upper beads in position. Of course a tire blank gripper is already known which engages the tire blank from above inside under the upper bead and puts it on the lower tire forming piece. The subsequently required centering of the upper bead on the tire-forming pieces to be closed is difficult.

OBJECTS OF THE INVENTION

It is an object of our invention to provide an improved method of and apparatus for loading a tire press which overcomes these drawbacks.

It is also an object of our invention to provide an improved apparatus and process for loading a tire press which dispenses with expensive auxiliary devices in the upper tire forming pieces of the tire press and eliminates the need for an outer gripper.

It is another object of our invention to provide an improved process and apparatus for loading a tire press which provides simple easy handling of the tire blank to be vulcanized.

It is a further object of our invention to provide an improved process and apparatus for loading a tire press which guarantees a reliable centering of both beads of the tire blank.

SUMMARY OF THE INVENTION

These objects and others which will become more readily apparent hereinafter are attained in accordance with our invention in a process for putting a tire blank to be vulcanized in a heated tire press from an tire blank stand comprising engaging or gripping the tire blank by a loader, swinging the tire blank into position between the tire forming pieces of the heated tire press and fastening the heated tire press to the upper bead of the tire blank, then releasing and pivoting away the loader from the tire blank, closing the tire press so that the upper and the lower bead contact on the associated rim rings of the tire press and fixing them thereon by air pressure and finally closing the tire forming pieces further.

According to our invention the loader engages the tire blank on the inside of the upper bead of the tire blank from below and mounts the tire blank on an upper rim ring on an upper tire forming piece in the heated tire press. Thus only after putting the upper bead on the upper rim ring is the device operated for fixing the bead in position before removing the loader. Immediately after that the tire forming pieces can be closed far enough so that the lower bead contacts on the lower rim ring and can be secured there in a known way be pressurized air. The cycle time of the heated tire press between the individual vulcanization processes is shortened in this way.

Advantageously the pressurized air pulse can be generated by a stroke like action of a heated bellows squeezing body attached to or supporting the lower rim ring. When a heated bellows is extended from a bellows guide tube connected with the lower tire forming pieces for subsequent closing of the tire press, this travel motion and/or a sufficient part thereof is employed with a correspondingly higher speed without which an additional air pressure production device might be necessary.

Further according to our invention an apparatus for putting a tire blank to be vulcanized having an upper and lower bead in a heated tire press having at least two tire forming pieces with associated rim rings from an tire blank stand comprises a loader insertable from below into the tire blank and pivotable between the tire forming pieces and the tire blank stand having a plurality of clamp jaws distributed around the circumference of the upper bead of the tire forming pieces.

The clamp jaws are foldable or swingable between a centered position supporting one of the tire blanks by the upper bead and a position free of the inner diameter of the upper and lower beads.

The stand of the tire blanks is provided with a frame member through which a retainer of the loader for the clamp jaws passes in being raised with the tire blank mounted thereon.

The foldability of the clamp jaws guarantees that after setting the upper bead on the upper rim ring of the tire press to mount the tire blank on the tire forming pieces they can pass through the lower bead on subsequent lowering of the loader and thus release from the mounted tire blank. After that they pass through the lower bead of the tire blank to be mounted next unimpeded and fold out into the interior of that tire blank in the supporting position in which the upper bead is engaged.

Advantageously the tire blank stand can be provided with a plurality of centering rods adjustable radially to the inner diameter of the tire blank mounted thereon placed between the clamp jaws. With that the tire blank is satisfactorily centered on the tire blank stand and its centered position is exactly reproducible in transfer to the loader. A reliable insertion between the tire forming pieces is then possible.

According to an additional feature of our invention under the lower rim ring of the heated tire press a seal against escaping air from the interior of the tire blank can be provided between a heated bellows guide pipe supporting the lower rim ring and the bellows squeezing body movable upwards guided in the heated bellows guide pipe.

Advantageously the seal can be in the form of a sealing collar mounted below the lower tire forming piece. Thus the complete air volume in the tire blank and in the heated bellows guide pipe up to this seal is fixed and repeatedly used for the high pressure increase caused by the air pressure so that the required speed increase of the bellows squeezing body can be properly provided.

In summary then in the process of our invention the tire blank is taken from an tire blank stand by a loader which engages it or grips it on its inside of the upper bead from below automatically. It is then swung into position between the tire forming pieces of the heated tire press and centered automatically in the heated tire press. Then the loader is released and pivoted away. No additional tire gripper or rim moving mechanism is required. The tire press can be closed.

Advantageously the upper and lower beads of the tire can be contacted on the associated rim rings accurately because of the automatic centering of the tire blank.

Then the tire blank or more particularly the beads of that tire can be fixed in the tire press on the tire forming pieces for example by a surge of air pressure. This air pressure can be provided by the stroke of a bellows squeezing body movable upwards in a heated bellows guide pipe attached to and supporting the lower rim ring of the tire press. Then the tire forming pieces or the tire press can be closed further on the tire blank.

In particular it especially advantageous when the loader grips or engages the tire blank on the inside of the upper bead of the tire blank from below and the tire is mounted on an upper one of the rim rings connected with an upper tire forming piece in the heated tire press.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
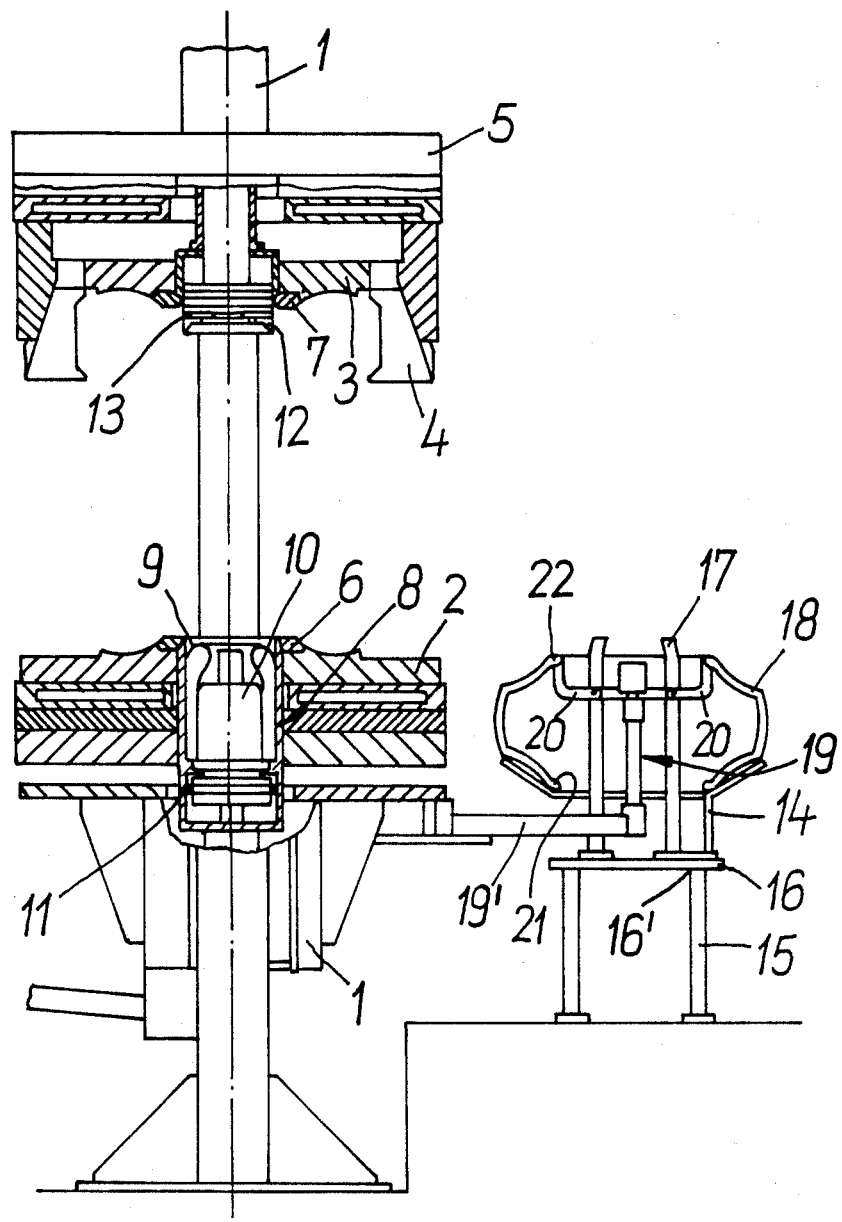
FIGS. 1, 2 and 3 are vertical cross sectional views of an apparatus for loading an tire blank to be vulcanized according to our invention in different operating positions.
Figure 2:
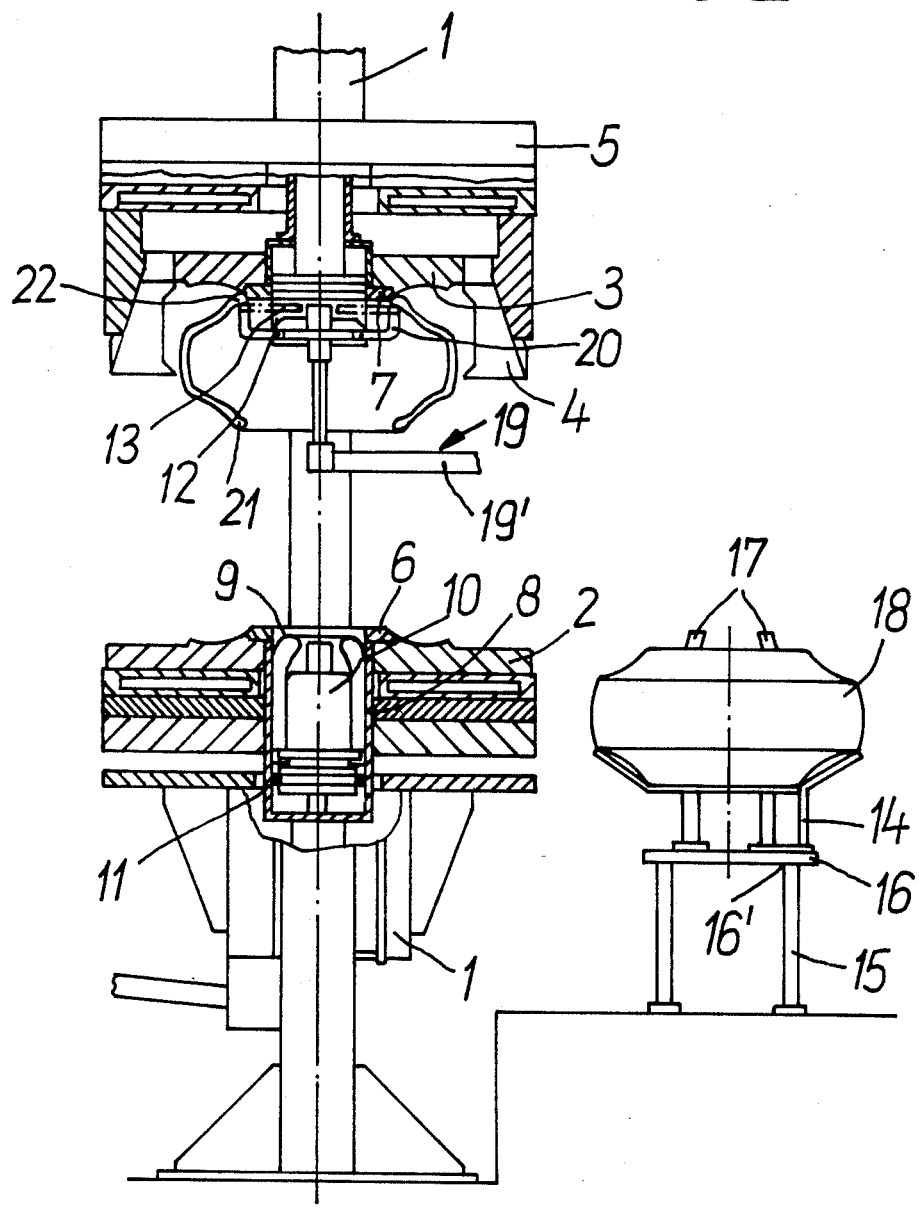
Figure 3:
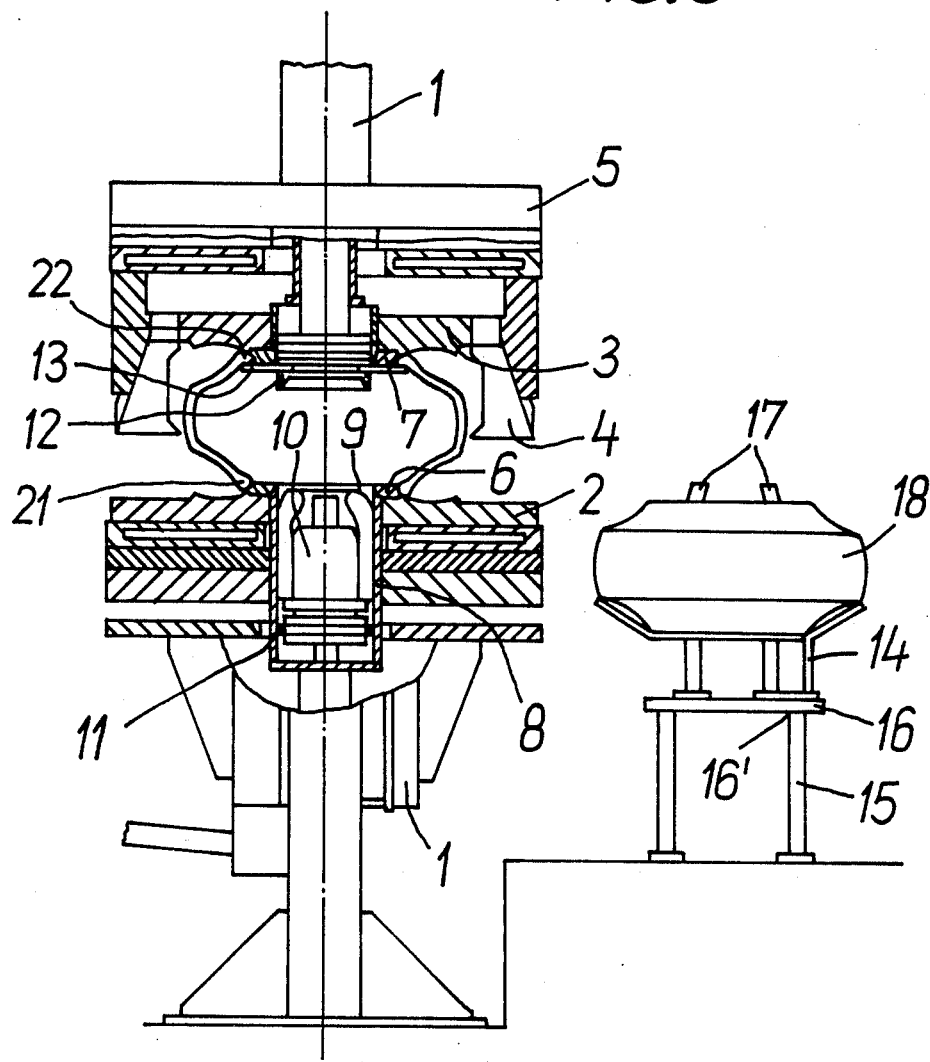
Figure 4:
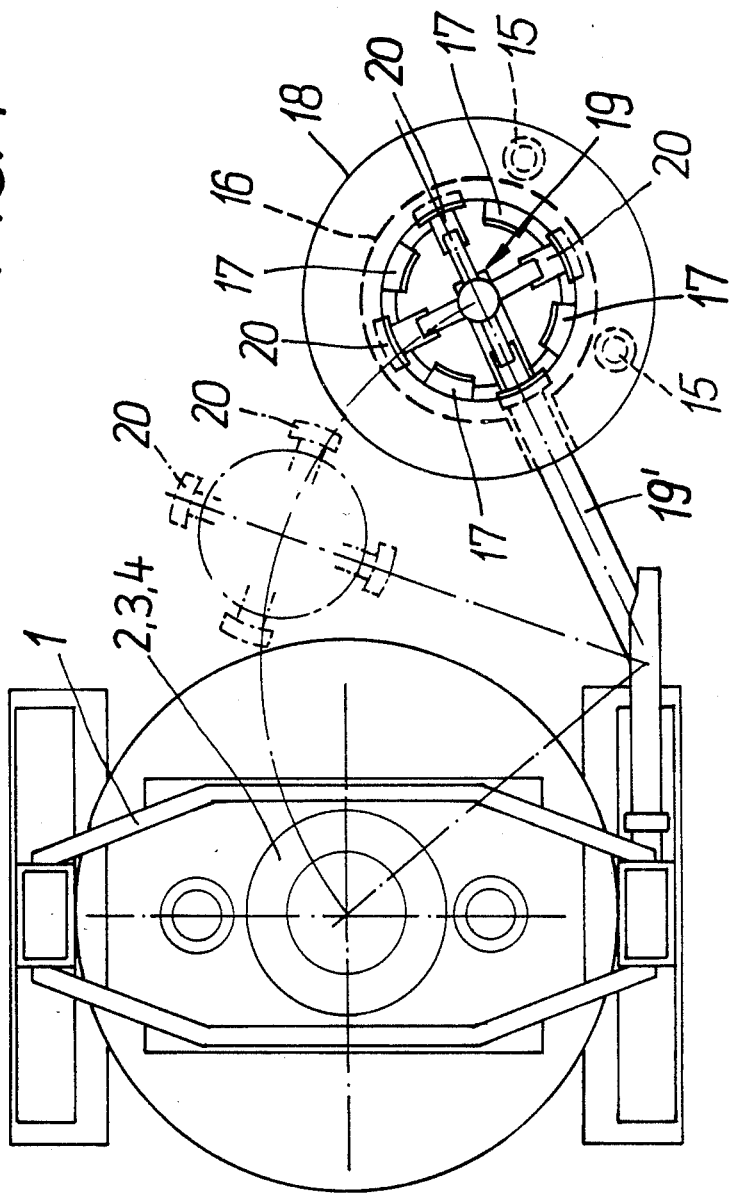
FIG. 4 is a top plan view of the apparatus of FIGS. 1, 2 and 3.

A lower tire forming piece 2, an upper tire forming piece 3 and a segment forming piece 4 are mounted in a heated tire press for vulcanizing unfinished pneumatic tires.

The upper tire forming piece 3 with the segment forming piece 4 is vertically movable by a driven press plate 5. A lower rim ring 6 and an upper rim ring 5 are each mounted on the tire forming pieces 2 and 3 respectively.

A heated bellows guide pipe 8 supporting the lower rim ring 6 is positioned in the lower tire forming piece 2 mounted on the press frame 1. A heated bellows 9 can be extended upward by a slidable bellows squeezing body 10.

The bellows squeezing body 10 is provided with a seal 11 surrounding it for sealing against the heated bellows guide pipe 8. In this case the seal 11 is a circular sealing collar.

A tire centering member 12 with extendable retaining fastener 13 is mounted on the upper tire forming piece 3. Adjacent the press frame 1 there is an tire blank stand 14 with a key hole like frame plate 16 resting on two supporting columns 15 on which four centering rods 17 are mounted. The opening in the tire blank is so formed that it can be passed through vertically by a loader 19 for transport of an tire blank 18 pivotally connected to the press frame 1 with a retainer 19' for the four supporting jaws 20 which are foldable in and out.

A tire blank 18 is first deposited on the tire blank stand 14 for lading in the heated tire press. The loader 19 swings under the frame plate 16. It travels then with the retainer 19' through the opening of the tire blank 18 and with the folded in supporting jaws 20 by the lower bead 21 of the tire blank 18.

In the interior of the tire blank 18 the supporting jaws 20 are folded out and the loader 19 travels further upwards until the supporting jaws 20 engage under the upper bead 22 of the tire blank 18.

Subsequently the loader 19 travels with the tire blank 18 mounted on the clamp jaws 20 once again upwards until it releases from the centering rods 17 and swings between the tire forming pieces 2 and 3. After that the upper bead 22 is pushed on the tire centering member 12 by the supporting jaws 20 and is held in place by the extendable retaining fastener 13. The supporting jaws 20 are folded in while the loader 19 is lowered and pass by the lower bead 21 unimpeded. After that the loader 19 is pivoted out from the vicinity of the tire forming pieces 2 and 3 and the upper tire forming piece 3 travels down until it contacts the lower bead 21 on the lower rim ring 6. Then the bellows squeezing body 10 is raised intermittently. The upper and lower beads 21 and 22 are fixed on the rim rings 6, 7 by the increasing air pressure. The heated bellows 9 can be put further in the tire blank 18 and the press can be closed for the vulcanization process.

By definition the loader 19 includes the jaws 22, the frame member 16' and the retainer 19 as well as any necessary related devices.

By definition also the frame member 16' of the loader 19 comprises the frame plate 16 and the supporting columns 15.

We claim:

1. In a process for introducing into a heated tire press a tire blank to be vulcanized and having an upper and a lower bead, said tire press having at least two tire forming, said blank being introduced into the press from a tire blank stand, said process comprising engaging said tire blank by a loader, swinging said tire blank into position between said tire forming pieces of said heated tire press and engaging said upper bead of said tire blank with said heated tire press, then releasing and pivoting away said loader from said tire blank, closing said tire press so that said upper and said lower beads respectively contact on an upper and lower rim ring of said heated tire press, fixing said upper and lower beads thereon by air pressure and finally closing said tire forming pieces further, the improvement wherein said loader engages said tire blank on the inside of said upper bead of said tire blank from below upon insertion into the blank from below and directly mounts said tire blank on said upper rim ring of an upper one of said tire forming pieces of said heated tire press.

2. The improvement according to claim 1 wherein said air pressure is made by a stroke like action of a heated bellows squeezing body of said lower rim ring.

3. An apparatus for inserting a tire blank to be vulcanized having an upper and a lower bead into a heated tire press having at least two tire forming pieces from a tire blanks stand comprising:
- an upper bead ring fixed in an upper one of said tire forming pieces;
- a loader positioned adjacent said heated tire press and insertable from below into said tire blank;
- means for pivoting said loader with said blank thereon into a position between said tire forming pieces from said tire blank stand and for affixing an upper bead of said blank, gripped from below by said loader, directly on said upper bead ring, said loader having a plurality of clamp jaws distributed around the circumference of said upper bead of said tire blank when said loader is positioned adjacent said tire blank, said clamp jaws being swingable between a centering position supporting said tire blank from below by said upper bead and a position inwardly of inner edges of said upper and lower beads, said loader and said clamps being insertable from below into a blank on said stand and retractable from below from a blank mounted on said upper bead ring; and
- a frame member on said stand through which clamp jaws of said loader pass on being raised with said tire blank mounted thereon.

4. The apparatus defined in claim 3 wherein said tire blank stand is provided with a plurality of centering rods adjustable radially to said inner diameter of said tire blank mounted thereon positioned between said clamp jaws when engaged with said tire blank.

5. The apparatus defined in claim 3 wherein a lower one of said pieces has a bead ring forming a seal with said lower bead against escaping air from the interior of said tire blank and in the form of a sleeve between a heated bellows guide pipe supporting said lower rim ring and a bellows squeezing body movable upwards in a stroke guided in said heated bellows guide pipe.

6. A method of inserting a tire blank to be vulcanized into a heated tire press having at least two tire forming pieces having associated rim rings for said tire blank from a tire blank stand, said tire blank having an upper and lower bead, said method comprising:
- (a) gripping said tire blank by a loader on the inside of said upper bead of said tire blank from below by inserting said loader from below into said blank through said stand;
- (b) swinging said tire blank on said loader into position between said tire forming pieces of said heated tire press and mounting said tire blank directly on an upper one of said rims rings connected with an upper one of said tire forming pieces in said heated tire press;
- (c) then releasing said blank, retracting said loader from the blank mounted on said upper one of said rim rings and pivoting said loader away from said tire blank;
- (d) closing said tire press so that said lower bead contacts on a lower one of said rim rings;
- (e) fixing said upper and lower beads on the respective rings by air pressure; and
- (f) further closing said tire forming pieces and vulcanizing said blank therebetween.

* * * * *